US010169681B2

(12) United States Patent
Tahmasebi Maraghoosh

(10) Patent No.: US 10,169,681 B2
(45) Date of Patent: Jan. 1, 2019

(54) QUALITY CONTROL OF IMAGE REGISTRATION

(71) Applicant: KONINKLIJKE PHILIPS N.V., Eindhoven (NL)

(72) Inventor: Amir Mohammad Tahmasebi Maraghoosh, Melrose, MA (US)

(73) Assignee: Koninklijke Philips N.V., Eindhoven (NL)

( * ) Notice: Subject to any disclaimer, the term of this patent is extended or adjusted under 35 U.S.C. 154(b) by 16 days.

(21) Appl. No.: 15/535,180

(22) PCT Filed: Dec. 1, 2015

(86) PCT No.: PCT/IB2015/059234
§ 371 (c)(1),
(2) Date: Jun. 12, 2017

(87) PCT Pub. No.: WO2016/097910
PCT Pub. Date: Jun. 23, 2016

(65) Prior Publication Data
US 2017/0364774 A1 Dec. 21, 2017

Related U.S. Application Data

(60) Provisional application No. 62/091,862, filed on Dec. 15, 2014.

(51) Int. Cl.
*G06K 9/62* (2006.01)
*G06T 7/174* (2017.01)
(Continued)

(52) U.S. Cl.
CPC ......... *G06K 9/6264* (2013.01); *G06K 9/6247* (2013.01); *G06K 9/6262* (2013.01);
(Continued)

(58) Field of Classification Search
CPC .. G06K 9/6264; G06K 9/6247; G06K 9/6262; G06T 7/174; G06T 7/35; G06T 7/0002; G06T 7/0012
See application file for complete search history.

(56) References Cited

U.S. PATENT DOCUMENTS 6,526,156 B1 * 2/2003 Black ..................... G06K 9/32
382/103
7,400,783 B2 7/2008 Sheu et al.
(Continued)

FOREIGN PATENT DOCUMENTS

CN 103337080 A 10/2013

OTHER PUBLICATIONS

Elsafi, A. et al: "Statistical simulation of deformations using wavelet independent component analysis", Proceedings of SPIE, SPIE—International Society for Optical Engineering, US, vol. 6978, Apr. 1, 2008, pp. 697813-1.
(Continued)

*Primary Examiner* — David F Dunphy

(57) ABSTRACT

An imaging quality control system (80) employing an imaging quality controller (84) and a monitor (81). In operation, the imaging quality controller (84) executes an image processing of subject image data of the anatomical object (e.g., subject non-segmentation-based or segmentation-based image registration of US, CT and/or MRI anatomical images), and assessing an accuracy of the image processing of the subject image data of the anatomical object as a function of a subject Eigen weight set relative to a training Eigen range set (e.g., previously registered or segmented US, CT and/or MRI anatomical images). The subject Eigen weight set is derived from the subject image data of the anatomical object, and the training Eigen range set is derived from training image data of anatomical object. The monitor (81) displays the assessment of the accuracy of the image
(Continued)

processing of the subject image data of the anatomical object by the imaging quality controller (84).

15 Claims, 6 Drawing Sheets

(51) Int. Cl.
    *G06T 7/00*           (2017.01)
    *G06T 7/35*           (2017.01)

(52) U.S. Cl.
    CPC .......... *G06T 7/0002* (2013.01); *G06T 7/0012* (2013.01); *G06T 7/174* (2017.01); *G06T 7/35* (2017.01); *G06T 2207/30168* (2013.01)

(56) References Cited

U.S. PATENT DOCUMENTS

| | | |
|---|---|---|
| 8,498,459 B2 | 7/2013 | Chefd'Hotel et al. |
| 2008/0187174 A1* | 8/2008 | Metaxas ............ G06K 9/00335 382/103 |
| 2010/0215229 A1* | 8/2010 | Allen .................... G06T 7/0012 382/128 |
| 2014/0037172 A1* | 2/2014 | Madabhushi ........ G06K 9/6232 382/131 |
| 2014/0126790 A1 | 5/2014 | Duchesne et al. |
| 2014/0169684 A1 | 6/2014 | Samii et al. |
| 2014/0247977 A1* | 9/2014 | Han ........................ G06K 9/34 382/159 |
| 2014/0270447 A1 | 9/2014 | Fei et al. |
| 2015/0010223 A1* | 1/2015 | Sapiro ............... G06F 17/30244 382/131 |
| 2015/0379723 A1* | 12/2015 | Reda ...................... A61B 6/03 382/131 |
| 2016/0005183 A1* | 1/2016 | Thiagarajan ........... A61B 5/055 382/131 |

OTHER PUBLICATIONS

West, J. et al., "Comparison and Evaluation of Retrospective Intermodality Brain Image Registration Techniques", Journal of Computer Assisted Tomography, vol. 21(4), Jul./Aug. 1997, pp. 554-568.

* cited by examiner

QUALITY CONTROL OF IMAGE REGISTRATION

CROSS-REFERENCE TO PRIOR APPLICATIONS

This application is the U.S. National Phase application under 35 U.S.C. § 371 of International Application Serial No. PCT/IB2015/059234, filed on Dec. 1, 2015, which claims the benefit of U.S. Application Ser. No. 62/091,862, filed on Dec. 15, 2014. These applications are hereby incorporated by reference herein.

FIELD OF THE INVENTION

The present invention generally relates to image registration and segmentation for medical procedures. The present invention specifically relates to an assessment of an accuracy of image registration and segmentation for medical procedures.

BACKGROUND OF THE INVENTION

Automatic registration and fusion of single/multiple imaging modalities is beneficial for various diagnostic and interventional procedures. Specifically, the registration of low-cost, real-time imaging such as ultrasound ("US") with prior three-dimensional ("3D") imaging (e.g., computed tomography "CT") or magnetic resonance imaging ("MRI") is desirable. To this end, numerous image registration techniques have been proposed. Some known techniques take advantage of the correlation between intensity values of corresponding content (e.g., an anatomical object) in both sides of the registration (i.e., non-segmentation-based image registration), while other known techniques, due to lack of such correlation, are anatomy-segmented driven, whereby the anatomy of interest is first segmented in both images and the registration is then conducted between the segmented objects using shape information and/or matching labels (i.e., segmentation-based image registration). The assessment of the registration and/or segmentation accuracy is always a challenge since a ground truth for the registration and/or segmentation doesn't exist.

SUMMARY OF THE INVENTION

The present invention proposes a novel and unique self-assessing tool for evaluating an accuracy of both non-segmentation-based and segmentation-based image registration techniques, particularly for image registration of an intra-operative anatomical image to a pre-operative anatomical image whereby the images are generated by a single imaging modality (e.g. US-US) or a dual imaging modality (e.g., US-CT or US-MRI). This present invention further proposes providing operator feedback for accepting or rejecting the results of such accuracy evaluation.

One form of the present invention is a imaging quality control system employing a imaging quality controller and a monitor. In operation, the imaging quality controller executes an image processing of subject image data of the anatomical object (e.g., subject non-segmentation-based and segmentation-based image of US, CT and/or MRI anatomical images), and assess an accuracy of the image processing of the subject image data of the anatomical object as a function of a subject Eigen weight set relative to a training Eigen weight range set (e.g., previously registered or segmented US, CT and/or MRI anatomical images). The subject Eigen weight set is derived from the subject image data of the anatomical object, and the training Eigen weight range set is derived from training image data of anatomical object. The monitor displays the assessment of the accuracy of the image processing of the subject image data of the anatomical object by the imaging quality controller.

For purposes of the present invention, the terms of the art including, but not limited to "image data", "anatomical object" "image processing", "non-segmentation-based image registration", "segmentation-based image registration", "anatomical object", "Eigen weight", "Eigen weight range", "imaging modality", "anatomical object" and "monitor", are to be interpreted as known in the art of the present invention and exemplary described herein.

For purposes of the present invention, the term "subject" broadly encompasses one or more imaging modalities subject to generating anatomical images for a specific medical purpose including, but not limited to, diagnostic and interventional procedures (e.g., brachytherapy procedures), and the term "training" broadly encompasses anatomical images generated by one or more imaging modalities for any purpose prior to a generation of the subject anatomical images. Examples of the imaging modalities include, but is not limited to, an ultrasound modality, a computed tomography modality and a magnetic resonance imaging modality.

The subject image data and the training image data may be inclusive of anatomical images from a single imaging modality, anatomical images from multiple imaging modalities and/or pre-processing before quality control (e.g., a mesh distance measurement between anatomical images from multiple imaging modalities).

For purposes of the present invention, the term "controller" broadly encompasses all structural configurations of an application specific main board or an application specific integrated circuit housed within or linked to a computer or another instruction execution device/system for controlling an application of various inventive principles of the present invention as subsequently described herein. The structural configuration of the controller may include, but is not limited to, processor(s), computer-usable/computer readable storage medium(s), an operating system, application module (s), peripheral device controller(s), slot(s) and port(s). Examples of a computer includes, but is not limited to, a server computer, a client computer, a workstation and a tablet.

A second form of the present invention is the imaging quality controller employing an image processing module executing the image processing of the subject image data of the anatomical object, and a quality assessment module operable configured assessing the accuracy of the image processing of the subject image data of the anatomical object by the image processing module as a function of a subject Eigen weight set relative to a training Eigen weight range set.

For purposes of the present invention, the term "module" broadly encompasses a component of the imaging quality controller consisting of an electronic circuit or an executable program (e.g., executable software and/firmware) for executing a specific application.

A third form of the present invention is a quality control method involving the imaging quality controller executing an image processing of the subject image data of the anatomical object and assessing an accuracy of the image processing of the subject image data of the anatomical object as a function of a subject Eigen weight set relative to a training Eigen weight range set. The quality control method further involves the monitor displaying the assessment of the accuracy of the image processing of the subject image data of the anatomical object by the imaging quality controller.

The foregoing forms and other forms of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PREFERRED EMBODIMENTS

To facilitate an understanding of the present invention, an example of a three (3) Eigen mode implementation of an imaging quality control will now be described in connection with FIG. 1. From the description of FIG. 1, those having ordinary skill in the art will understand how to make and use the present invention for numerous Eigen mode implementations (e.g., an eight (8) Eigen mode implementation) of an imaging quality control for various known imaging processing techniques (e.g., non-segmentation-based and segmentation-based image registrations).

For purposes of the present invention, the terms of the art related to Eigen physics including, but not limited to "Eigen mode extraction" and "Eigen weight computation", are to be interpreted as known in the art of the present invention and exemplary described herein.

Figure 1:
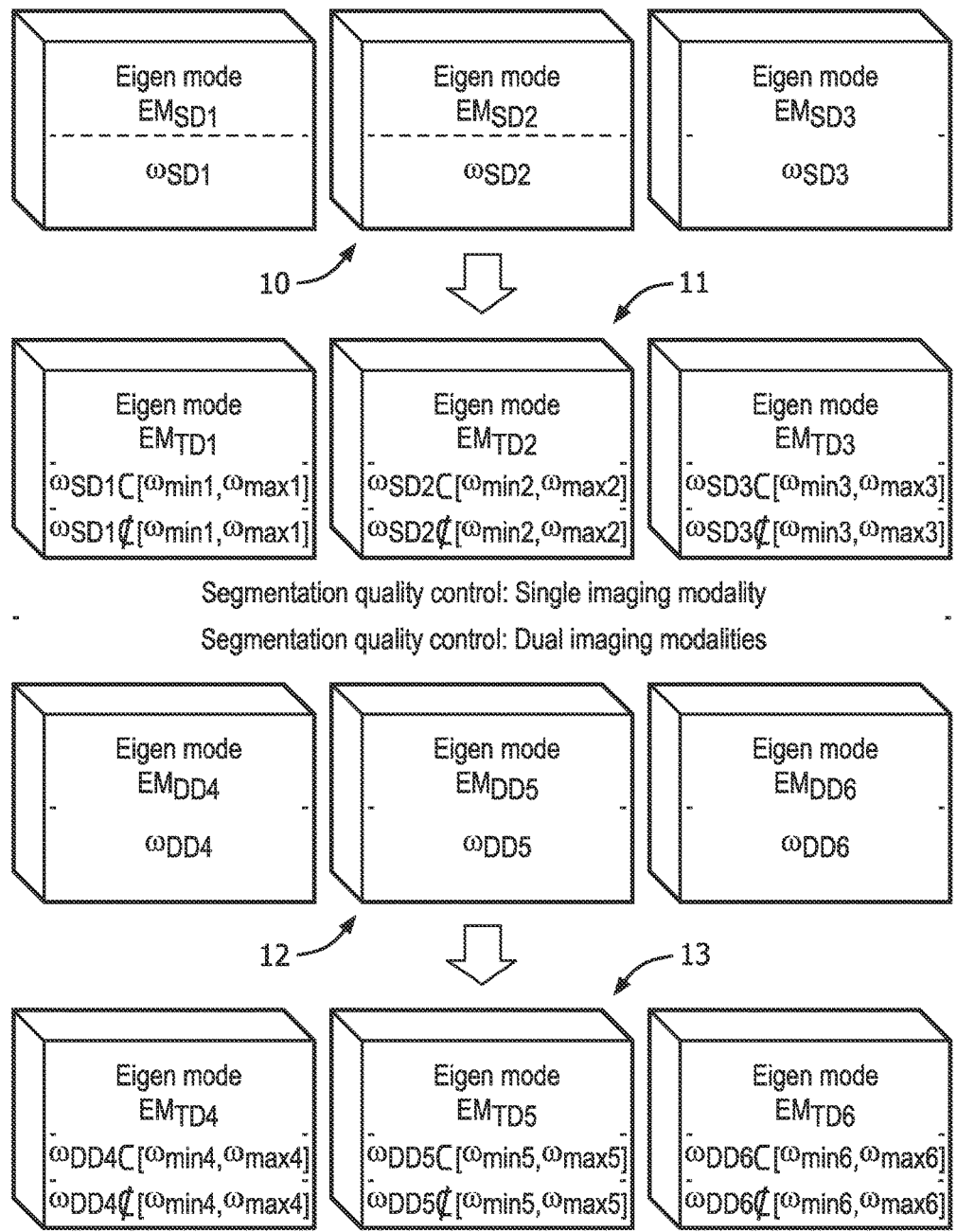
FIG. 1 illustrates exemplary image registration/segmentation accuracy determinations to demonstrate the inventive principles of the present invention.

Referring to FIG. 1, the present invention is premised on accepting or rejecting an image processing (e.g., non-segmentation-based and segmentation-based image registrations) based on assessment of a quality relevance of a subject Eigen weight set to a training Eigen weight range set derived from a subject image data SD and training image data TD generated by a single imaging modality (e.g., ultrasound) or dual imaging modalities (e.g., ultrasound to CT or MRI). For non-segmentation-based image registration, the subject image data SD and training image data TD are inclusive of transformation matrixes derived, for example, from registration based on intensity values of an anatomical object illustrated in the images. For segmentation-based image registration, the subject image data SD and training image data TD are inclusive of either registration based on segmented anatomical objects illustrated in the images or transformation matrixes derived, for example, from registration based on intensity values of an anatomical object illustrated in the images.

Single Imaging Modality.

By example, as shown in FIG. 1, a quality relevance may be assessed of a subject Eigen weight set 10 of $\{w\omega_{SD1}, \omega_{SD2}, \omega_{SD3}\}$ computed from three (3) Eigen modes $EM_{SD1}$-$EM_{SD3}$ of a subject anatomical image generated by a single image modality to a training Eigen weight range set 11 of $\{[\omega_{MIN1},\omega_{MAX1}], [\omega_{MIN2},\omega_{MAX2}], [\omega_{MIN3}, \omega_{MAX3}]\}$ computed from three (3) identical Eigen modes $EM_{m1}$-$EM_{TD3}$ of training anatomical images of the same image modality.

The quality relevance assessment may involve a computation of a metric distance between the subject Eigen weight set 10 of $\{\omega_{SD1},\omega_{SD2},\omega_{SD3}\}$ and training Eigen weight range set 11 of $\{[\omega_{MIN1},\omega_{MAX1}],[\omega_{MIN2},\omega_{MAX2}],[\omega_{MIN3},\omega_{MAX3}]\}$.

More particularly, the metric distance computation may involve a determination of a degree of membership of the subject Eigen weight set 10 of $\{\omega_{SD1},\omega_{SD2},\omega_{SD3}\}$ and training Eigen weight range set 11 of $\{[\omega_{MIN1},\omega_{MAX1}],[\omega_{MIN2},\omega_{MAX2}],[\omega_{MIN3},\omega_{MAX3}]\}$. For purposes of the present invention, the phrase "degree of membership" broadly encompasses a simple or biased accounting of a number of subject Eigen weights which are members of corresponding training Eigen weight ranges.

For example, the accounting may involve a determination of whether:

(1) subject Eigen weight of $\omega_{SD1}$ is or is not a member of training Eigen weight range $[\omega_{MIN1},\omega_{MAX1}]$;

(2) subject Eigen weight of $\omega_{SD2}$ is or is not a member of training Eigen weight range $[\omega_{MIN2},\omega_{MAX2}]$; and (3) subject Eigen weight of $\omega_{SD1}$ is or is not a member of training Eigen weight range $[\omega_{MIN3},\omega_{MAX3}]$.

With a simple accounting, the higher the number of Eigen weights that are members of corresponding Eigen weight ranges, then the higher the accuracy of the image processing (e.g., registration or segmentation).

With a biased accounting, the more variable Eigen weight(s) being member(s) of corresponding Eigen weight range(s) as compared to the less variable Eigen weight(s) being member(s) of corresponding Eigen weight range(s) indicates a higher accuracy of the image processing.

Dual Imaging Modality.

By further example, as shown in FIG. 1, a mesh distance DD between anatomical images generated by dual imaging modalities is calculated from subject image data (e.g., a node corresponding Euclidean distance between shapes of a preoperative MRI anatomical image and an intraoperative ultrasound anatomical image) and training subject data TD (e.g., a node corresponding Euclidean distance between shapes of previous MRI and ultrasound anatomical images).

The quality relevance may be assessed of subject Eigen weight set 13 of $\{\omega_{DD4},\omega_{DD5},\omega_{DD6}\}$ computed from three (3) Eigen modes $EM_{DD4}$-$EM_{DD6}$ of the subject mesh distance to a training Eigen weight range set 14 of $\{[\omega_{MIN4},\omega_{MAX4}],[\omega_{MIN5},\omega_{MAX5}],[\omega_{MIN6},\omega_{MAX6}]\}$ computed from three (3) identical Eigen modes $EM_{TD4}$-$EM_{TD6}$ of the training mesh distances.

The quality relevance assessment may involve a computation of a metric distance between the subject Eigen weight set 13 of $\{\omega_{DD4},\omega_{DD5},\omega_{DD6}\}$ and training Eigen weight range set 14 of $\{[\omega_{MIN4},\omega_{MAX4}],[\omega_{MIN5},\omega_{MAX5}],[\omega_{MIN6},\omega_{MAX6}]\}$.

More particularly, the metric distance computation may involve a determination of a degree of membership of the subject Eigen weight set 13 of $\{\omega_{DD4},\omega_{DD5},\omega_{DD6}\}$ and training Eigen weight range set 14 of $\{[\omega_{MIN4},\omega_{MAX4}],$ $[\omega_{MIN5},\omega_{MAX5}],[\omega_{MIN6},\omega_{MAX6}]\}$. Again, for purposes of the present invention, the phrase "degree of membership" broadly encompasses a simple or biased accounting of a number of subject Eigen weights which are members of corresponding training Eigen weight ranges.

For example, the accounting may involve a determination of whether:

(1) subject Eigen weight of $\omega_{DD4}$ is or is not a member of training Eigen weight range $[\omega_{MIN4},\omega_{MAX4}]$;

(2) subject Eigen weight of $\omega_{DD5}$ is or is not a member of training Eigen weight range $[\omega_{MIN5},\omega_{MAX5}]$; and (3) subject Eigen weight of $\omega_{DD6}$ is or is not a member of training Eigen weight range $[\omega_{MIN6},\omega_{MAX6}]$.

With a simple accounting, the higher the number of Eigen weights that are members of corresponding Eigen weight ranges, then the higher the accuracy of the image processing (e.g., registration or segmentation).

With a biased accounting, the more variable Eigen weight(s) being member(s) of corresponding Eigen weight range(s) as compared to the less variable Eigen weight(s) being member(s) of corresponding Eigen weight range(s) indicates a higher accuracy of the image processing.

From the description of FIG. 1, those having ordinary skill in the art having an understanding how to make and use the present invention for numerous Eigen mode implementations (e.g., an eight (8) Eigen mode implementation) of an imaging quality control for various known imaging processing techniques. To facilitate a further understanding of the present invention, an example of a three (3) Eigen mode implementation of an imaging quality control for image registration and segmentation will now be described herein in connection with FIGS. 2-6.

Figure 2:
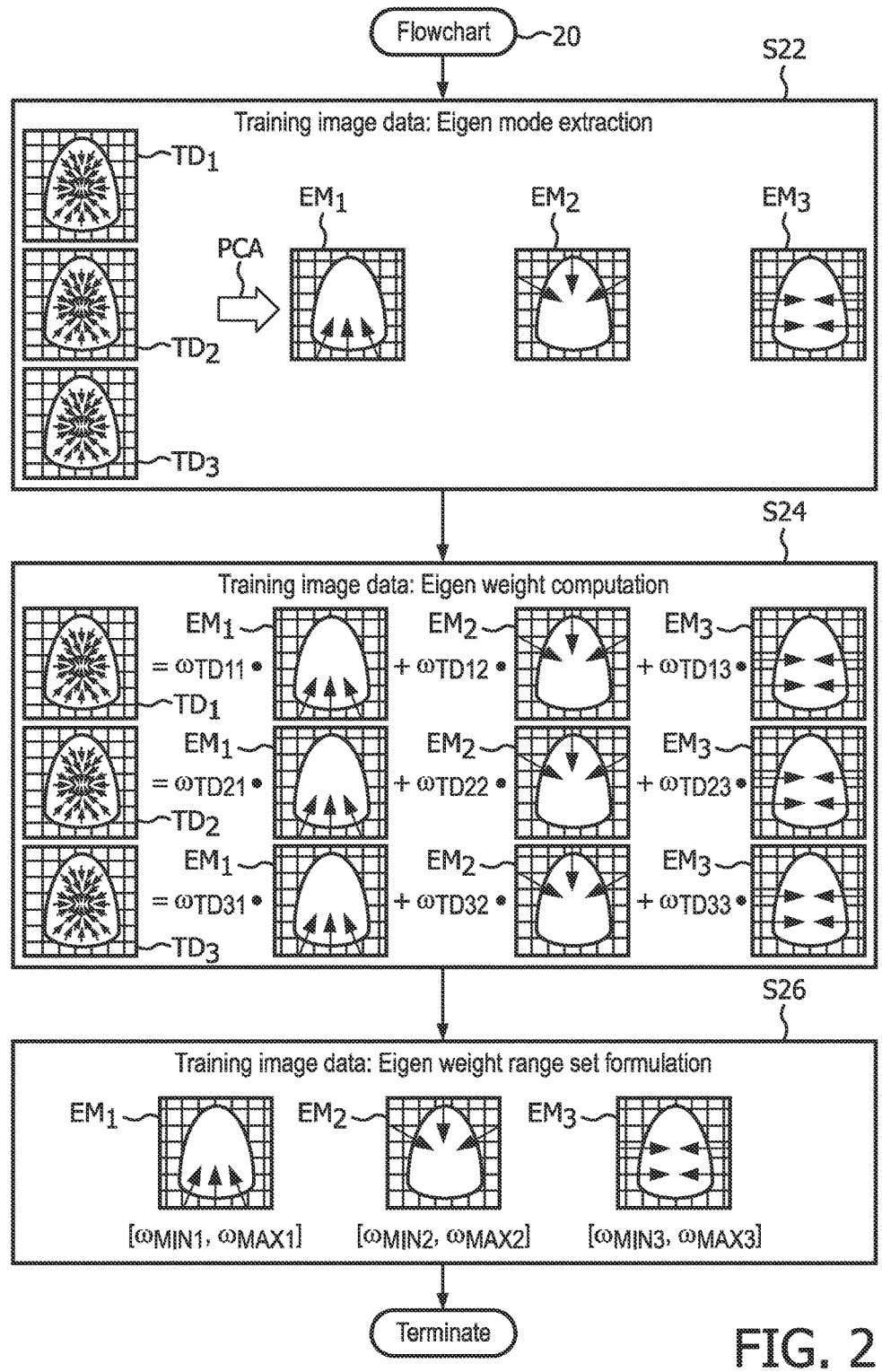
FIG. 2 illustrates a flowchart representative of an exemplary embodiment of a training phase of a single imaging modality quality control method of the present invention.

FIG. 2 illustrates a flowchart 20 representative of a training phase of a single imaging modality quality control method of the present invention. Flowchart 20 is described in the context of training image data $TD_1$-$TD_3$ inclusive of transformation matrixes derived, for example, from registration based on intensity values of an anatomical object illustrated in the images and/or inclusive of segmented anatomical objects illustrated in the images.

A stage S22 of flowchart 20 encompasses an Eigen mode extraction of training image data $TD_1$-$TD_3$ resulting in a series of Eigen modes $EM_1$-$EM_3$ as shown. In practice, the extraction is performed within statistical analysis framework, preferably a Principal Component Analysis ("PCA") as shown.

Within the same statistical analysis framework, a stage S24 of flowchart 20 encompasses an Eigen weight computation resulting in a Eigen mode series of weights ω for each training image data TD as shown.

A stage S26 of flowchart 20 encompasses a formulation of a Eigen weight range for each Eigen mode EM based on a pooling of all weights ω. In practice, each Eigen weight range consists of a minimum Eigen weight $\omega_{MIN}$ and a maximum Eigen weight $\omega_{MAX}$ delineated from a plausible range of variation of each Eigen mode EM.

For example, a lowest Eigen weight ω among Eigen weights $\omega_{TD11\text{-}WTD33}$ may be initially selected as the minimum Eigen weight $\omega_{MIN}$, and a highest Eigen weight ω among Eigen weights $\omega_{TD11\text{-}WTD33}$ may be initially selected as the maximum Eigen weight $\omega_{MAX}$. If this range is deemed plausible based on a probability analysis of Eigen weights $\omega_{TD11\text{-}WTD33}$, then the lowest Eigen weight ω and the highest Eigen weight ω define the range. Otherwise, the next lowest Eigen weight ω and/or the next highest Eigen weight ω are selected until the probability analysis indicates a plausible range.

Figure 3:
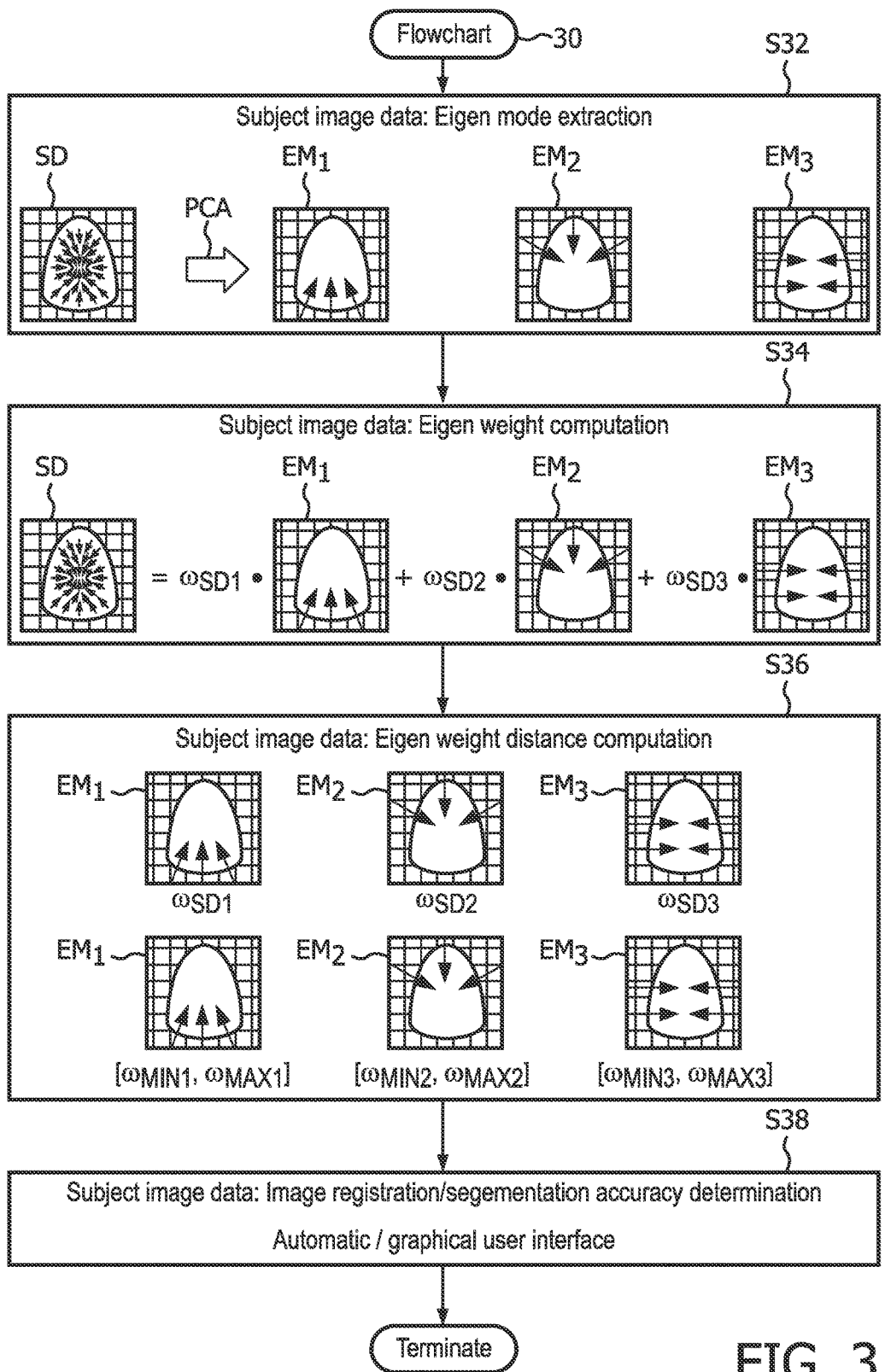
FIG. 3 illustrates a flowchart representative of an exemplary embodiment of a subject phase of a single imaging modality quality control method of the present invention.

FIG. 3 illustrates a flowchart 30 representative of a subject phase of a single imaging modality quality control method of the present invention. Flowchart 30 is described in the context of subject image data SD being inclusive of transformation matrixes derived, for example, from registration based on intensity values of an anatomical object illustrated in the images and/or inclusive of segmented anatomical objects illustrated in the images.

A stage S32 of flowchart 30 encompasses an Eigen mode extraction of subject image data $SD_1$-$SD_3$ resulting in the series of Eigen modes $EM_1$-$EM_3$ as shown. In practice, the extraction is performed within the same statistical analysis framework as the training image data $TD_1$-$TD_3$ of FIG. 2, preferably a Principal Component Analysis ("PCA") as shown.

Within the same statistical analysis framework, a stage S34 of flowchart 230 encompasses an Eigen weight computation resulting in a Eigen mode series of weights ω for subject image data SD as shown.

A stage S36 of flowchart 30 encompasses a computation of an Eigen weight distance between the subject Eigen weight set $\{\omega_{SD1},\omega_{SD2},\omega_{SD3}\}$ and the training Eigen weight ranges set $\{[\omega_{MIN1},\omega_{MAX1}],[\omega_{MIN2},\omega_{MAX2}],[\omega_{MIN3},\omega_{MAX3}]\}$ involving a determination of whether:

(1) subject Eigen weight of $\omega_{SD1}$ is or is not a member of training Eigen weight range $[\omega_{MIN1},\omega_{MAX1}]$;

(2) subject Eigen weight of $\omega_{SD2}$ is or is not a member of training Eigen weight range $[\omega_{MIN2},\omega_{MAX2}]$; and (3) subject Eigen weight of $\omega_{SD3}$ is or is not a member of training Eigen weight range $[\omega_{MIN3},\omega_{MAX3}]$.

In a simple accounting mode, all Eigen weights required to be a member of a corresponding training Eigen weight range to automatically or provisionally delineate the segmentation or registration transformation of subject image data SD as being accurate for image processing purposes.

In a biased accounting mode where Eigen weight $\omega_{SD1}$ is the more Eigen weight as compared to Eigen weights $\omega_{SD2}$ and $\omega_{SD3}$, then Eigen weight $\omega_{SD1}$ is required to be a member of training Eigen weight range $[\omega_{MIN1},\omega_{MAX1}]$ or Eigen weights $\omega_{SD2}$ and $\omega_{SD3}$ are required to be members of respective training Eigen weight range $[\omega_{MIN2},\omega_{MAX2}]$ and $[\omega_{MIN3},\omega_{MAX3}]$ to automatically or provisionally delineate the segmentation or registration transformation of subject image data SD as being accurate for image processing purposes.

A stage S38 of flowchart 30 encompasses an automatic or a system operator determination of an accuracy of the segmentation or registration transformation of subject image data SD. For the automatic mode, the system operator will be informed of the accuracy determination and further image processing of subject image data SD will be prohibited. For the provisional mode, an graphical user interface information of the distance computation of stage S36 will be displayed whereby the system operator may select whether or not to proceed with further imaging processing of subject image data SD.

Figure 4:
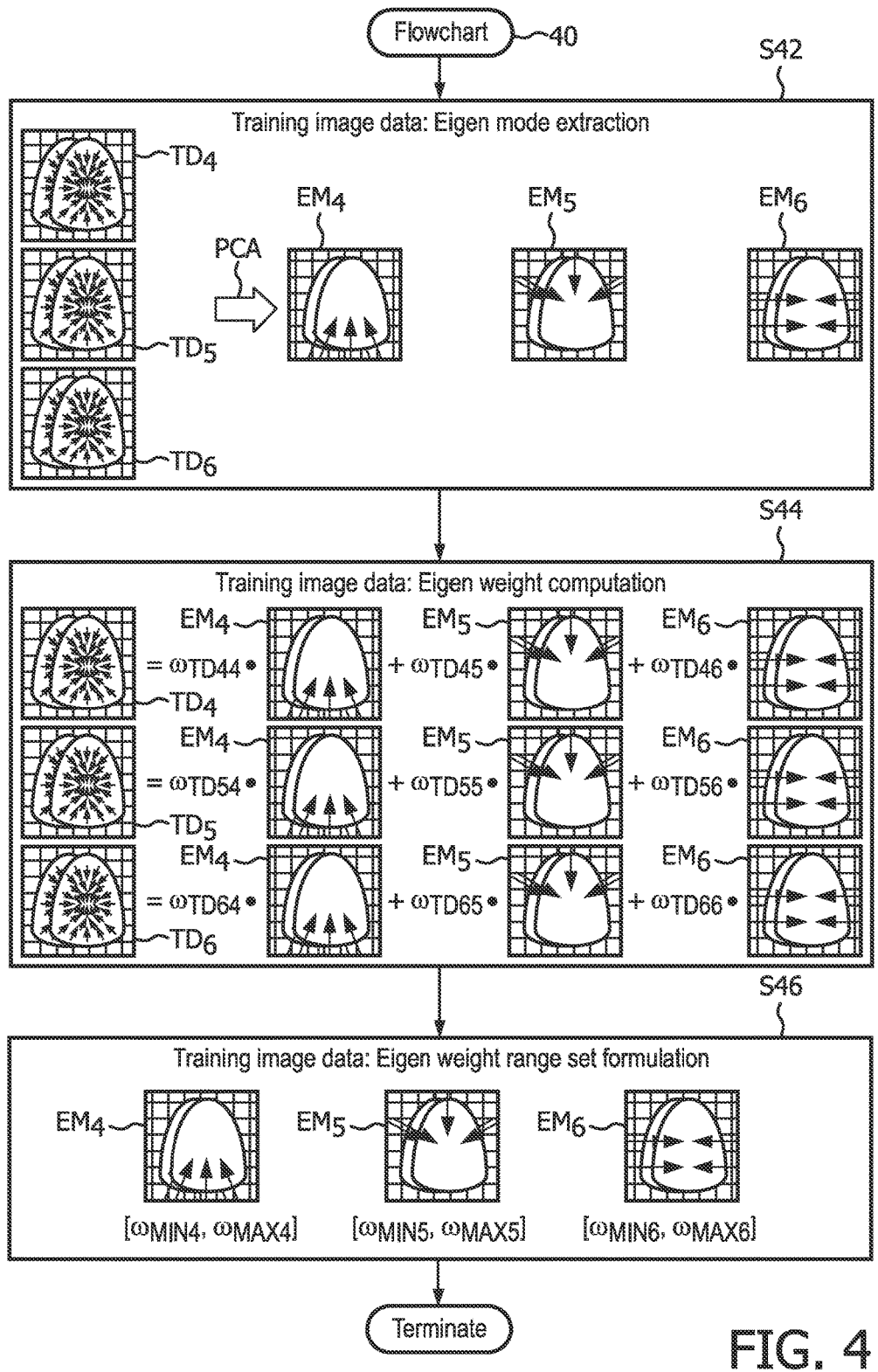
FIG. 4 illustrates a flowchart representative of an exemplary embodiment of a training phase of a dual imaging modalities quality control method of the present invention.

FIG. 4 illustrates a flowchart 40 representative of a training phase of a dual imaging modalities quality control method of the present invention. Flowchart 40 is described in the context of training image data $TD_1$-$TD_3$ inclusive of transformation matrixes derived, for example, from registration based on intensity values of an anatomical object illustrated in the images and/or inclusive of segmented anatomical objects illustrated in the images.

A stage S42 of flowchart 40 encompasses an Eigen mode extraction of training image data $TD_4$-$TD_6$ resulting in a series of Eigen modes $EM_4$-$EM_6$ as shown. In practice, the extraction is performed within statistical analysis framework, preferably a Principal Component Analysis ("PCA") as shown.

Within the same statistical analysis framework, a stage S44 of flowchart 40 encompasses an Eigen weight computation resulting in a Eigen mode series of weights ω for each training image data TD as shown.

A stage S46 of flowchart 40 encompasses a formulation of a Eigen weight range for each Eigen mode EM based on a pooling of all weights ω. In practice, each Eigen weight range consists of a minimum Eigen weight $\omega_{MIN}$ and a maximum Eigen weight $\omega_{MAX}$ delineated from a plausible range of variation of each Eigen mode EM.

For example, a lowest Eigen weight ω among Eigen weights $\omega_{TD11\text{-}WTD33}$ may be initially selected as the minimum Eigen weight $\omega_{MIN}$, and a highest Eigen weight ω among Eigen weights $\omega_{TD44\text{-}WTD66}$ may be initially selected as the maximum Eigen weight $\omega_{MAX}$. If this range is deemed plausible based on a probability analysis of Eigen weights $\omega_{TD44\text{-}WTD66}$, then the lowest Eigen weight ω and the highest Eigen weight ω define the range. Otherwise, the next lowest Eigen weight ω and/or the next highest Eigen weight ω are selected until the probability analysis indicates a plausible range.

Figure 5:
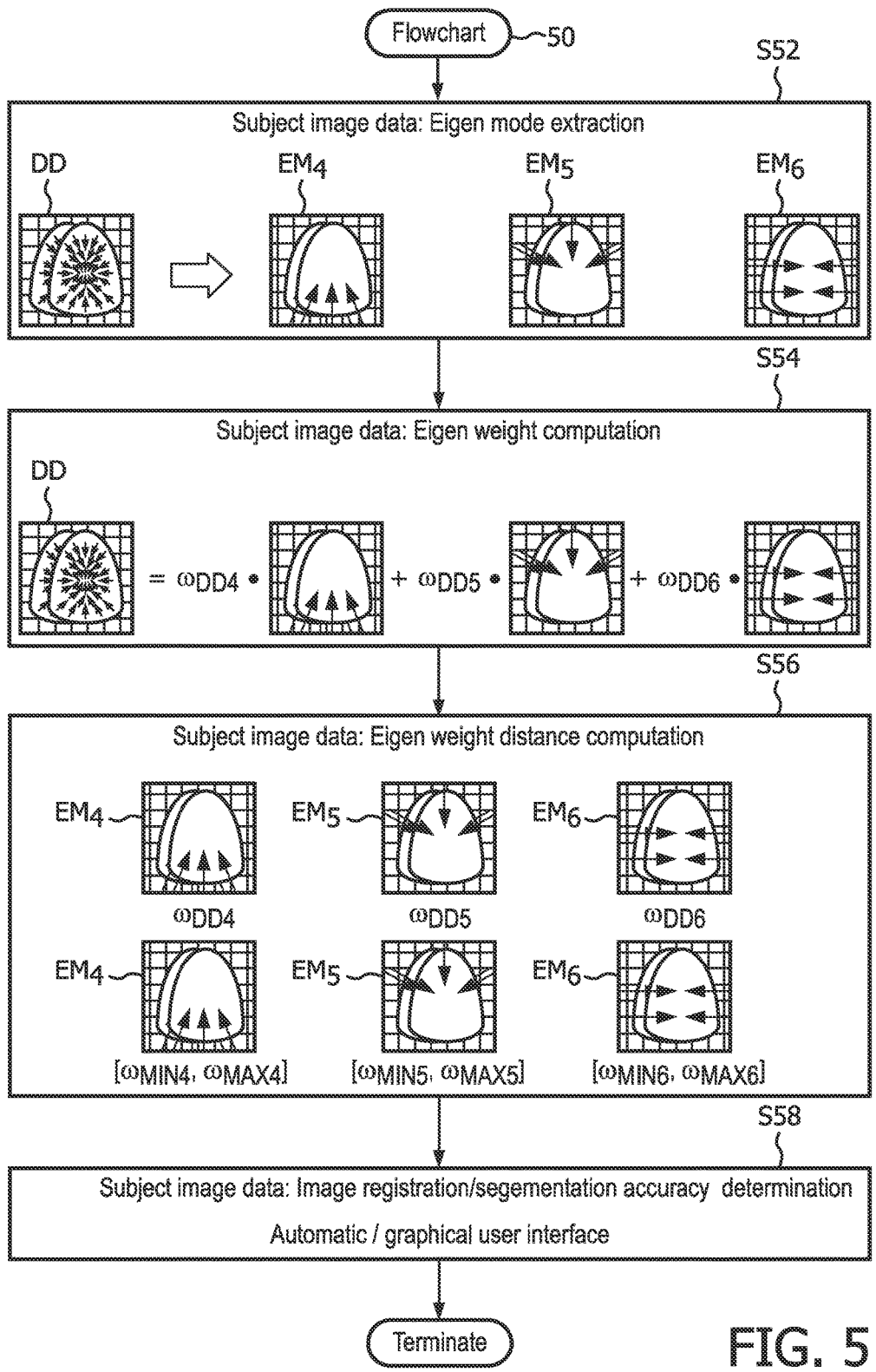
FIG. 5 illustrates a flowchart representative of an exemplary embodiment of a subject phase of a dual imaging modalities quality control method of the present invention.

FIG. 5 illustrates a flowchart 50 representative of a subject phase of a dual imaging modalities quality control method of the present invention. Flowchart 50 is described in the context of subject image data DD being inclusive of transformation matrixes derived, for example, from registration based on intensity values of an anatomical object illustrated in the images and/or inclusive of segmented anatomical objects illustrated in the images.

A stage S52 of flowchart 50 encompasses an Eigen mode extraction of subject image data $DD_4$-$DD_6$ resulting in the series of Eigen modes $EM_4$-$EM_6$ as shown. In practice, the extraction is performed within the same statistical analysis framework as the training image data $TD_4$-$TD_6$ of FIG. 4, preferably a Principal Component Analysis ("PCA") as shown.

Within the same statistical analysis framework, a stage S54 of flowchart 250 encompasses an Eigen weight computation resulting in a Eigen mode series of weights ω for subject image data DD as shown.

A stage S56 of flowchart 50 encompasses a computation of an Eigen weight distance between the subject Eigen weight set $\{\omega_{DD4},\omega_{DD5},\omega_{DD6}\}$ and the training Eigen weight ranges set $\{[\omega_{MIN4},\omega_{MAX4}],[\omega_{MIN5},\omega_{MAX5}],[\omega_{MIN6},\omega_{MAX6}]\}$ involving a determination of whether:

(1) subject Eigen weight of $\omega_{DD4}$ is or is not a member of training Eigen weight range $[\omega_{MIN4},\omega_{MAX4}]$;

(2) subject Eigen weight of $\omega_{DD5}$ is or is not a member of training Eigen weight range $[\omega_{MIN5},\omega_{MAX5}]$; and (3) subject Eigen weight of $\omega_{DD6}$ is or is not a member of training Eigen weight range $[\omega_{MIN6},\omega_{MAX6}]$.

In a simple accounting mode, all Eigen weights required to be a member of a corresponding training Eigen weight range to delineate the segmentation or registration transformation of subject image data DD as being accurate for image processing purposes.

In a biased accounting mode where Eigen weight $\omega_{DD4}$ is the more Eigen weight as compared to Eigen weights $\omega_{DD5}$ and $\omega_{DD6}$, then Eigen weight wpm is required to be a member of training Eigen weight range $[\omega_{MIN4},\omega_{MAX4}]$ or Eigen weights $\omega_{DD5}$ and $\omega_{DD6}$ are required to be members of respective training Eigen weight range $[\omega_{MIN5},\omega_{MAX5}]$ and $[\omega_{MIN6},\omega_{MAX6}]$ to delineate the segmentation or registration transformation of subject image data DD as being accurate for image processing purposes.

A stage S58 of flowchart 50 encompasses an automatic or a system operator determination of an accuracy of the segmentation or registration transformation of subject image data SD. For the automatic mode, the system operator will be informed of the accuracy determination and further image processing of subject image data SD will be prohibited. For the provisional mode, an graphical user interface information of the distance computation of stage S56 will be displayed whereby the system operator may select whether or not to proceed with further imaging processing of subject image data SD.

From the description of FIGS. 2-6, those having ordinary skill in the art will appreciate how to execute non-segmentation-based image registration and segmentation-based registration of anatomical images for both the training phase and the subject phase.

To further explain non-segmentation-based image registration, by example, an intensity-based image registration may be executed on CT-MRI anatomical images, MRI-MRI anatomical images or CT-CT anatomical images prior to the training phase of flowchart 20 (FIG. 2) or flowchart 40 (FIG. 4). The results are a series of transformations from each registration of an anatomical image pairing.

Executing flowchart 20 or flowchart 40 thereafter involves a PCA of the transformations, which results in a number of Eigen modes and corresponding Eigen weights. From the Eigen weights, plausible minimum and maximum Eigen weights are derived for the PCA components. More particularly, assuming a first mode of PCA captures the scale differences between the two registered images, then the minimum and maximum training Eigen weights possible within the population are definable.

Prior to the subject phase of flowchart 30 or flowchart 50, a transformation is calculated from an intensity-based image registration of the subject anatomical images of intra-operative CT to pre-operative MRI, intra-operative MRI to pre-operative MRI or intra-operative CT to pre-operative CT. Executing flowchart 30 or flowchart 50 thereafter involves an extraction of Eigen weights from a projection along PCA modes and a determination if the subject Eigen weights are within the minimum and maximum training Eigen weights.

If the subject Eigen weights of the transformations are within the minimum and maximum training Eigen weights, then the intensity-based image registration of the subject anatomical images of intra-operative CT to pre-operative MRI, intra-operative MRI to pre-operative MRI, intra-operative CT to pre-operative CT registration is deemed accurate.

Otherwise, if the subject Eigen weights of the transformations are NOT within the minimum and maximum training Eigen weights, then the intensity-based image registration of the subject anatomical images of intra-operative CT to pre-operative MRI, intra-operative MRI to pre-operative MRI or intra-operative CT to pre-operative CT is deemed inaccurate or raises a flag for operator consideration.

In practice, an imaging quality control system of the present invention may employ segregated or integrated subsystems for performing the training phase and the subject phase of the imaging quality control system as exemplarily shown in FIGS. 2-4.

Figure 6:
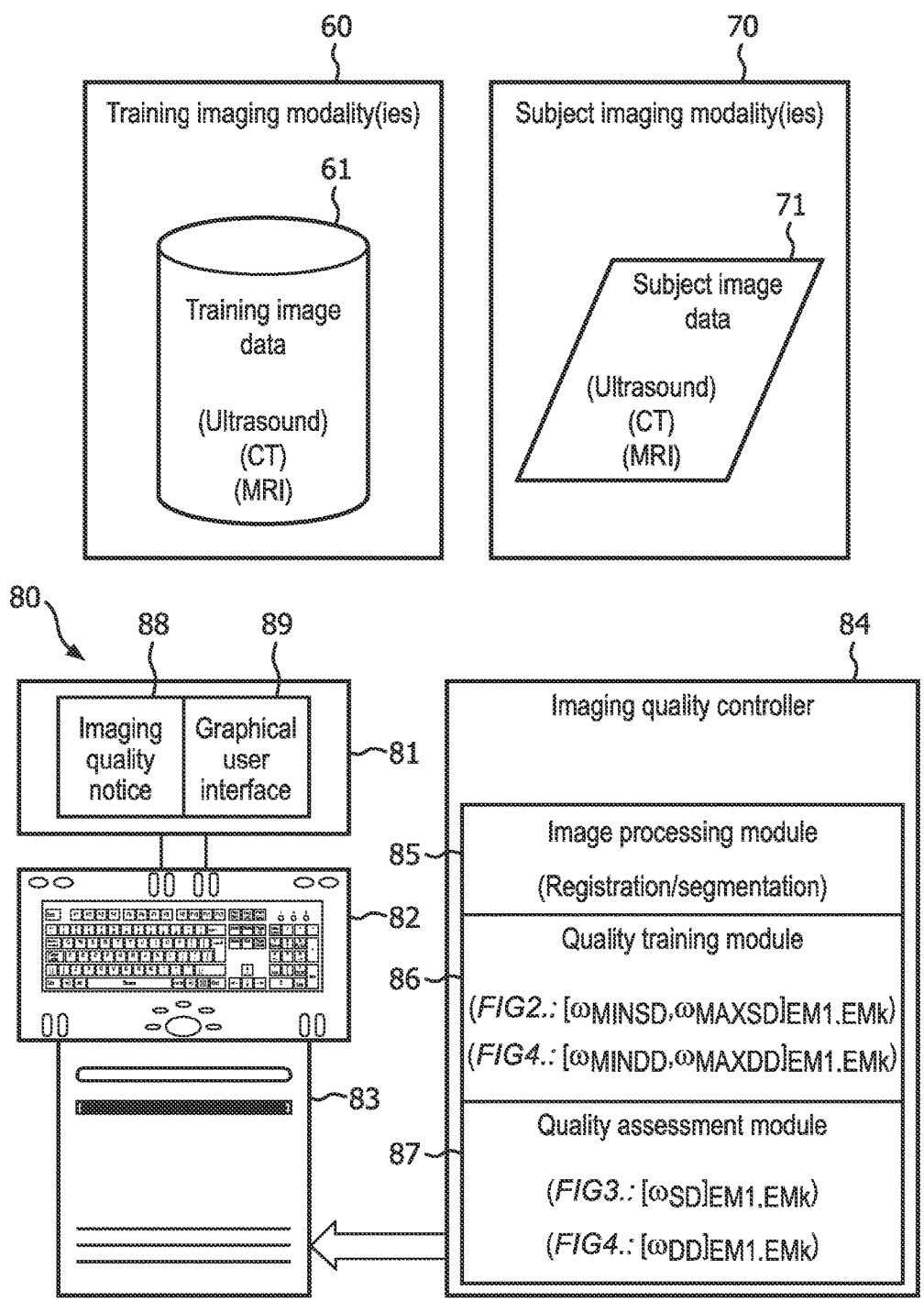
FIG. 6 illustrates an exemplary embodiment of an imaging quality control system in accordance with the present invention.

Referring to FIG. 6, an imaging quality control system 80 employs an imaging quality controller 84 for performing the training phase and the subject phase of the imaging quality control system. To this end, imaging quality control system 80 employs a monitor 81, an interface platform 82, a workstation 83 and imaging quality controller 84 installed within workstation 83.

Imaging quality controller 84 includes and/or is accessible by an operating system (not shown) as known in the art for controlling various graphical user interfaces, data and images on monitor 81 as directed by a workstation operator (e.g., a doctor, technician, etc.) via a keyboard, buttons, dials, joysticks, etc. of interface platform 82, and for storing/reading data as programmed and/or directed by the workstation operator of interface platform 82.

Workstation 83 may be connected/coupled to one or more training imaging modalities 60 or data storage devices (not shown) as known in the art to input training image data 61 to be processed by imaging quality controller 84. Additionally, workstation 83 may be connected/coupled to one or more subject imaging modalities 70 or data storage devices (not shown) as known in the art to input subject image data 71 to be processed by imaging quality controller 84.

Imaging quality controller 84 employs an image processing module 85 for executing various image processing techniques including, but not limited to, a non-segmentation-based image registration and a segmentation-based image registrations.

Imaging quality controller 84 further employs a quality training module 86 for executing flowcharts 20 (FIG. 2) and 40 (FIG. 4). For the training phase of a single imaging modality and dual imaging modalities, module 86 formulates respective training Eigen weight range set including $[\omega_{MINSD}, \omega_{MAXSD}]$ and $[\omega_{MINDD}, \omega_{MAXDD}]$ for a k number of Eigen mode, k≥1.

Imaging quality controller 84 further employs a quality assessment module 87 for executing flowcharts 30 (FIG. 3) and 50 (FIG. 5). For the subject phase of a single imaging modality and dual imaging modalities, module 87 formulates respective subject Eigen weight set including $[\omega_{SD}]$ and $[\omega_{DD}]$ for each Eigen mode.

Imaging quality controller 84 controls a display of an imaging quality notice 88 on monitor 81 for an automatic assessment mode or a graphical user interface 84 for an operator selection mode.

Referring to FIGS. 1-6, from the description of the exemplary embodiments of a mounting arm and intervention workstation of the present invention, those having ordinary skill in the art will appreciate numerous benefits of the present invention including, but not limited to, an avoidance of non-segmentation-based and segmentation-based image registration errors within a diagnosis and/or interventional procedure that heavily rely on the outcome of such imaging registration/segmentation.

Furthermore, as one having ordinary skill in the art will appreciate in view of the teachings provided herein, features, elements, components, etc. described in the present disclosure/specification and/or depicted in the FIGS. 1-6 may be implemented in various combinations of electronic components/circuitry, hardware, executable software and executable firmware, particularly as application modules of an imaging quality controller as described herein, and provide functions which may be combined in a single element or multiple elements. For example, the functions of the various features, elements, components, etc. shown/illustrated/depicted in the FIGS. 1-6 can be provided through the use of dedicated hardware as well as hardware capable of executing software in association with appropriate software. When provided by a processor, the functions can be provided by a single dedicated processor, by a single shared processor, or by a plurality of individual processors, some of which can be shared and/or multiplexed. Moreover, explicit use of the term "processor" should not be construed to refer exclusively to hardware capable of executing software, and can implicitly include, without limitation, digital signal processor ("DSP") hardware, memory (e.g., read only memory ("ROM") for storing software, random access memory ("RAM"), non-volatile storage, etc.) and virtually any means and/or machine (including hardware, software, firmware, circuitry, combinations thereof, etc.) which is capable of (and/or configurable) to perform and/or control a process.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (e.g., any elements developed that can perform the same or substantially similar function, regardless of structure). Thus, for example, it will be appreciated by one having ordinary skill in the art in view of the teachings provided herein that any block diagrams presented herein can represent conceptual views of illustrative system components and/or circuitry embodying the principles of the invention. Similarly, one having ordinary skill in the art should appreciate in view of the teachings provided herein that any flow charts, flow diagrams and the like can represent various processes which can be substantially represented in computer readable storage media and so executed by a computer, processor or other device with processing capabilities, whether or not such computer or processor is explicitly shown.

Furthermore, exemplary embodiments of the present invention can take the form of a computer program product or application module accessible from a computer-usable and/or computer-readable storage medium providing program code and/or instructions for use by or in connection with, e.g., a computer or any instruction execution system. In accordance with the present disclosure, a computer-usable or computer readable storage medium can be any apparatus that can, e.g., include, store, communicate, propagate or transport the program for use by or in connection with the instruction execution system, apparatus or device. Such exemplary medium can be, e.g., an electronic, magnetic, optical, electromagnetic, infrared or semiconductor system (or apparatus or device) or a propagation medium. Examples of a computer-readable medium include, e.g., a semiconductor or solid state memory, magnetic tape, a removable computer diskette, a random access memory (RAM), a read-only memory (ROM), flash (drive), a rigid magnetic disk and an optical disk. Current examples of optical disks include compact disk read only memory (CD-ROM), compact disk read/write (CD-R/W) and DVD. Further, it should be understood that any new computer-readable medium which may hereafter be developed should also be considered as computer-readable medium as may be used or referred to in accordance with exemplary embodiments of the present invention and disclosure.

Having described preferred and exemplary embodiments of novel and inventive system and method for quality control of non-segmented and segmented image registration, (which embodiments are intended to be illustrative and not limiting), it is noted that modifications and variations can be made by persons having ordinary skill in the art in light of the teachings provided herein, including the FIGS. 1-6. It is therefore to be understood that changes can be made in/to the preferred and exemplary embodiments of the present disclosure which are within the scope of the embodiments disclosed herein.

Moreover, it is contemplated that corresponding and/or related systems incorporating and/or implementing the device or such as may be used/implemented in a device in accordance with the present disclosure are also contemplated and considered to be within the scope of the present invention. Further, corresponding and/or related method for manufacturing and/or using a device and/or system in accordance with the present disclosure are also contemplated and considered to be within the scope of the present invention.

The invention claimed is:

1. An imaging quality control system, comprising:
an imaging quality controller operable to execute an image processing of subject image data of an anatomical object,
wherein the image processing is at least one of a non-segmentation-based image registration and a segmentation-based image registration,
wherein the imaging quality controller is further operable to assess an accuracy of the image processing of the subject image data of the anatomical object as a function of a subject Eigen weight set relative to a training Eigen weight range set,
wherein the subject Eigen weight set is derived from the subject image data of the anatomical object, and
wherein the training Eigen weight range set is derived from multiple training image data of the anatomical object; and
a monitor in communication with the imaging quality controller to display an assessment of the accuracy of the image processing of the subject image data of the anatomical object by the imaging quality controller.

2. The imaging quality control system of claim 1, wherein the subject image data includes one of subject ultrasound data, subject computed tomography data and subject magnetic resonance imaging data.

3. The imaging quality control system of claim 2, wherein the multiple training image data includes one of multiple training ultrasound data, multiple training computed tomography data and multiple training magnetic resonance imaging data.

4. The imaging quality control system of claim 1, each image data includes at least one of a transformation matrix and a segmented anatomical object.

5. The imaging quality control system of claim 1, wherein the imaging quality controller is operable to extract a subject Eigen mode set from the subject image data.

6. The imaging quality control system of claim 5, wherein the imaging quality controller is operable to compute the subject Eigen weight set as a function of the subject Eigen mode set.

7. The imaging quality control system of claim 1, wherein the imaging quality controller is operable to compute a metric distance between the subject Eigen weight set and the training Eigen weight range set.

8. The imaging quality control system of claim 1, wherein the imaging quality controller is operable to assess a degree of membership of the subject Eigen weight set within the training Eigen weight range set.

9. The imaging quality control system of claim 8, wherein the imaging quality controller is operable to delineate an accurate image processing of the subject image data responsive to the subject Eigen weight set including a specific degree of membership within the training Eigen weight range set.

10. The imaging quality control system of claim 1, wherein the imaging quality controller is operable to delineate an inaccurate image processing of the subject image data responsive to the subject Eigen weight set excluding a specific degree of membership within the training Eigen weight range set.

11. An imaging quality controller, comprising:
an image processing module operable to execute an image processing of subject image data of an anatomical object;
wherein the image processing is at least one of a non-segmentation-based image registration and a segmentation-based image registration; and
a quality assessment module operable to assess an accuracy of the image processing of the subject image data of the anatomical object by the image processing module as a function of a subject Eigen weight set relative to a training Eigen weight range set,
wherein the subject Eigen weight set is derived from the subject image data of the anatomical object, and
wherein the training Eigen weight range set is derived from multiple training image data of the anatomical object.

12. The imaging quality controller of claim 11,
wherein the quality assessment module is operable to extract a subject Eigen mode set from the subject image data; and
wherein the quality assessment module is operable to compute the subject Eigen weight set as a function of the subject Eigen mode set.

13. The imaging quality controller of claim 11,
wherein the quality assessment module is operable to compute a metric distance between the subject Eigen weight set and the training Eigen weight range set.

14. The imaging quality controller of claim 11,
wherein the quality assessment module is operable to assess a degree membership of the subject Eigen weight set within the training Eigen weight range set.

15. The imaging quality controller of claim 14,
wherein the quality assessment module is operable to delineate an accurate image processing of the subject image data responsive to the subject Eigen weight set including a specific degree of membership within the training Eigen weight range set; and
wherein the quality assessment module is operable to delineate an inaccurate image processing of the subject image data responsive to the subject Eigen weight set excluding the specific degree of membership within the training Eigen weight range set.

* * * * *